United States Patent
Ferraro et al.

(10) Patent No.: US 10,485,370 B2
(45) Date of Patent: Nov. 26, 2019

(54) INFUSION UNIT FOR MAKING BEVERAGES WITH A HYDRAULIC CLOSING SYSTEM

(71) Applicant: KONINKLIJKE PHILIPS N.V., Eindhoven (NL)

(72) Inventors: Andrea Ferraro, Eindhoven (NL); Andrea Favero, Eindhoven (NL); Andrea Castellani, Eindhoven (NL); Giovanni Berto, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 205 days.

(21) Appl. No.: 14/758,576

(22) PCT Filed: Jan. 2, 2014

(86) PCT No.: PCT/IB2014/058020
§ 371 (c)(1),
(2) Date: Jun. 30, 2015

(87) PCT Pub. No.: WO2014/108813
PCT Pub. Date: Jul. 17, 2014

(65) Prior Publication Data
US 2015/0351580 A1    Dec. 10, 2015

Related U.S. Application Data (60) Provisional application No. 61/750,860, filed on Jan. 10, 2013.

(51) Int. Cl.
*A47J 31/46* (2006.01)
*A47J 31/36* (2006.01)
(Continued)

(52) U.S. Cl.
CPC ........... *A47J 31/0647* (2013.01); *A23F 5/262* (2013.01); *A47J 31/3671* (2013.01); *A47J 31/46* (2013.01)

(58) Field of Classification Search
CPC ..... A47J 31/0647; A47J 31/46; A47J 31/3671
See application file for complete search history.

(56) References Cited

U.S. PATENT DOCUMENTS

| | | | | |
|---|---|---|---|---|
| 3,266,410 A | * | 8/1966 | Novi | A47J 31/3609 222/334 |
| 3,327,614 A | * | 6/1967 | Nourse | A47J 31/3657 222/129.1 |

(Continued)

FOREIGN PATENT DOCUMENTS

| CH | 673211 A5 * | 2/1990 | .......... A47J 31/3671 |
|---|---|---|---|
| CN | 1156020 A | 8/1997 | |

(Continued)

OTHER PUBLICATIONS

Office Action issued in connection with corresponding 14700315.6, dated May 20, 2016, 3 pages.

(Continued)

*Primary Examiner* — Ibrahime A Abraham
*Assistant Examiner* — John J Norton
(74) *Attorney, Agent, or Firm* — Schott, P.C.

(57) ABSTRACT

The infusion unit comprises a receptacle (25, 27) for receiving at least one ingredient in bulk form for the preparation of a beverage, as well as a brewing piston (33) arranged for insertion in the receptacle and forming a brewing chamber therewith. The brewing piston (33) is provided with a sealing arrangement (35) for sliding and sealing engagement with an inner wall of the receptacle when the brewing piston is in the receptacle. A hydraulic actuator (51) controls the movement of the brewing piston (33) so as to adjust the volume of the brewing chamber by moving the brewing piston in a brewing position inside the receptacle. A hot (Continued)

water delivery circuit (39) is further provided, for delivering hot water in the interior of the brewing chamber and performing a brewing cycle.

16 Claims, 3 Drawing Sheets

(51) Int. Cl.
  *A23F 5/26* (2006.01)
  *A47J 31/06* (2006.01)

(56) References Cited

U.S. PATENT DOCUMENTS

| | | | |
|---|---|---|---|
| 3,604,335 A * | 9/1971 | Lafitte | A47J 31/24 99/302 P |
| 3,793,935 A | 2/1974 | Martin | |
| 4,253,385 A * | 3/1981 | Illy | A47J 31/3685 99/281 |
| 4,852,472 A * | 8/1989 | In-Albon | A47J 31/3614 99/289 R |
| 5,255,594 A * | 10/1993 | Grossi | A47J 31/3614 99/287 |
| 5,911,810 A * | 6/1999 | Kawabata | A47J 31/34 99/289 P |
| 6,510,783 B1 | 1/2003 | Basile et al. | |
| 6,711,988 B1 * | 3/2004 | Eugster | A47J 31/36 99/283 |
| 8,124,150 B2 * | 2/2012 | Doglioni Majer | A47J 31/3609 426/231 |
| 8,601,937 B2 * | 12/2013 | Campetella | A47J 31/3609 99/286 |
| 8,887,624 B2 | 11/2014 | Magna | |
| 2008/0095903 A1 | 4/2008 | Weijers | |
| 2010/0173054 A1 | 7/2010 | Camera | |

FOREIGN PATENT DOCUMENTS

| | | |
|---|---|---|
| CN | 1431880 A | 7/2003 |
| CN | 200957018 Y | 10/2007 |
| CN | 201153866 Y | 11/2008 |
| CN | 202128317 U | 2/2012 |
| CN | 202269899 U | 6/2012 |
| CN | 102711569 A | 10/2012 |
| EP | 0184561 A1 | 6/1986 |
| EP | 2050370 A1 | 4/2009 |
| JP | 2011-520493 A | 7/2011 |
| JP | 2012-514492 A | 6/2012 |
| WO | 09912457 A1 | 3/1999 |
| WO | 0049926 A1 | 8/2000 |
| WO | 2009157025 A1 | 12/2009 |
| WO | 2011077317 A2 | 6/2011 |
| WO | 2012001592 A1 | 1/2012 |

OTHER PUBLICATIONS

Office Action issued in connection with corresponding 201480004487.9, dated Mar. 31, 2017, 15 pages.
Office Action issued in connection with corresponding 14700315.6, dated Jun. 9, 2017, 4 pages.
Office Action issued in connection with corresponding 2015-552167, dated Oct. 2, 2017, 10 pages.
Office Action issued in connection with corresponding 2014206114, dated Oct. 13, 2017, 3 pages.
Office Action issued in connection with corresponding 14700315.6, dated Mar. 7, 2018, 4 pages.
Office Action issued in connection with corresponding 201480004487.9, dated Jul. 31, 2018, 8 pages.
Office Action issued in connection with corresponding 2015-552167, dated Aug. 17, 2018, 9 pages.
Office Action issued in connection with corresponding 201480004487.9, dated Nov. 7, 2018, 17 pages.
Notice of Allowance issued in connection with corresponding 2015-552167, dated Apr. 24, 2019, 8 pages.

* cited by examiner

INFUSION UNIT FOR MAKING BEVERAGES WITH A HYDRAULIC CLOSING SYSTEM

This application is the U.S. National Phase application under 35 U.S.C. § 371 of International Application No. PCT/IB2014/058020, filed on Jan. 2, 2014, which claims the benefit of U.S. Provisional Application No. 61/750,860 filed on Jan. 10, 2013. These applications are hereby incorporated by reference herein.

FIELD OF THE INVENTION

The present invention concerns the field of beverage producing machines, such as espresso coffee machines and the like.

More specifically the present invention concerns improvements to the infusion unit for such beverage producing machines.

BACKGROUND OF THE INVENTION

In the field of beverage producing machines, and in particular espresso makers, devices are known, which make use of capsules or pods, containing ingredients for the preparation of the beverage, for example ground coffee powder. The pod or capsule is introduced in a brewing chamber. The brewing chamber is closed and pressurized hot water is caused to flow through the capsule or pod to extract the coffee. An infusion unit using pods of this kind is disclosed for example in WO 00/49926. A hydraulic closure system is provided in this known device. The brewing chamber is formed by two substantially symmetrical brewing chamber portions which are opened and closed by the hydraulic system. Between the two brewing chamber portions a sealing gasket is provided, which seals the brewing chamber by squeezing the pod rim between the two brewing chamber portions when the brewing chamber is hydraulically closed.

In other known machines, ingredients for the preparation of the beverage are introduced in bulk form in the brewing chamber. For example, coffee beans are ground and the ground coffee powder is directly charged in the brewing chamber to subsequently perform an automatic brewing cycle. In other machines the coffee powder is manually charged in a filter placed in a filter holder, the filter holder is connected to a water dispensing unit and locked thereon; hot and pressurized brewing water is then delivered through the filter holder and the coffee bed pressed inside the brewing chamber.

An example of a manual machine using a filter holder for bulk material is disclosed in EP 2050370. An infusion unit having an automatic filter holder and brewing chamber is disclosed in WO 2009/157025.

In some known machines the dimension of the brewing chamber can be changed to brew either one or two cups of beverages. For example in manual machines different filter holders are used to house larger and smaller filters for producing alternatively two coffee cups or just one. In WO-A-2012/001592 a brewing unit for an automatic beverage-producing machine is disclosed, which is capable of modifying the volume of the brewing chamber based upon the amount of ingredients (e.g. ground coffee powder) loaded in the brewing chamber. An electric actuator moves a cup-shaped brewing chamber portion from a loading position to a brewing position. In the loading position coffee powder or another ingredient is loaded in the cup-shaped brewing chamber portion. In the brewing position the cup-shaped brewing chamber portion is moved towards a closure piston which enters into the cup-shaped brewing chamber portion and presses the ingredients therein. The piston is resiliently biased by a spring. The spring is compressed by the thrust exerted against the piston by the movable cup-shaped brewing chamber portion and by the ingredients loaded therein, under the control of the electric actuator. The piston is thus moved backwards as the cup-shaped brewing chamber portion moves towards a final brewing position. Once the cup-shaped brewing chamber portion has reached the final position, which is independent of the amount of ingredients loaded therein, the piston is hydraulically locked before starting the brewing cycle. The backwards stroke performed by the piston is dependent upon the amount of ingredients loaded in the brewing chamber. Movement of the piston is entirely passive, since the latter moves backwards under the action of the actuator that moves the cup-shaped brewing chamber portion forward.

Depending on the way of using the machine and/or on the quality of the ground coffee powder, a larger or smaller volume of coffee powder can be charged each time in the brewing chamber. This causes some difficulties when the brewing chamber is closed. If too much coffee powder is charged, the closing system is overstressed in case of an automatic machine. If the machine is of the manual kind, the operator has to exert a stronger force to close the brewing chamber. Especially in the case of manual machines, the amount of coffee powder can vary depending upon the ability of the operator and this can cause problems during brewing.

If an insufficient amount of coffee powder is loaded in the brewing chamber, a weak coffee is obtained and at the end of the brewing cycle a large amount of water remains on top of the exhausted coffee powder.

At the end of the brewing cycle a certain amount of water remains on top of the spent coffee powder. This amount of water is subsequently removed along with the spent coffee from the brewing chamber and increases the overall amount of residues generated by the brewing process. The energy used to heat such amount of water is not useful for the beverage production and is therefore wasted.

There is therefore a need for an improved infusion unit which overcomes or alleviates one or more the abovementioned drawbacks.

SUMMARY OF THE INVENTION

The present invention provides an infusion unit for producing drinks or beverages, in particular hot beverages, such as espresso coffee, which comprises a receptacle, for receiving at least one ingredient in bulk form for the preparation of a beverage, and a brewing piston arranged for insertion in the receptacle and forming a brewing chamber therewith. The brewing piston is provided with a sealing arrangement for sliding and sealing engagement with an inner wall of the receptacle when the brewing piston is in the receptacle. The infusion unit further comprises a hydraulic actuator that controls the movement of the brewing piston so as to adjust the volume of the brewing chamber by moving the brewing piston in a brewing position inside the receptacle. The hydraulic actuator is preferably constrained to the brewing piston. The brewing position is thus adapted to the amount of the ingredient in the brewing chamber. The infusion unit also includes a hot water delivery circuit for delivering hot water in the interior of the brewing chamber. Water flows through the ingredient(s) contained in the brewing chamber to perform a brewing cycle.

In some embodiments hot water is delivered in the brewing chamber through the brewing piston. The hot water delivery circuit can comprise a hot-water delivery duct in fluid communication with a surface of the brewing piston, wherein the surface faces the interior of the brewing chamber when the brewing piston is inside the receptacle.

The hydraulic actuator controls the movement of the brewing piston inside the receptacle, so as to adjust the volume of the brewing chamber to the amount of ingredient(s) loaded in the brewing chamber. Adjustment of the volume of the brewing chamber can be performed before starting the brewing cycle. Afterwards the brewing piston can be maintained in a stationary, i.e. fixed position. In other embodiments, the position of the brewing piston can be controlled and modified for continuously adapting the volume of the brewing chamber, e.g. to compensate for a variation of the volume of the ingredients. Control can be performed by maintaining constant the pressure in the hydraulic actuator and thus maintaining a constant pressure on the ingredients contained in the brewing chamber.

The hydraulic actuator moves the brewing piston inside the receptacle until the required pressure has been reached. The ingredients in the receptacle are thus compacted to a desired degree before starting the beverage producing cycle. The stroke performed by the brewing piston under the control of the hydraulic actuator depends upon the amount of ingredients in the receptacle. A constant final compaction of the ingredients in the receptacle can be obtained irrespective of the amount of ingredients loaded in the receptacle, thanks to the possibility of controlling the movement of the brewing piston in the receptacle by means of the hydraulic actuator. The volume of the brewing chamber can thus be largely variable and automatically adapted to the amount of ingredients loaded in the brewing chamber.

Contrary to known prior art beverage producing units, wherein a piston is movable under the thrust exerted by an electric actuator until a fixed final position of the brewing chamber is achieved, according to the present invention the displacement of the piston is positively controlled by the hydraulic actuator to move the piston to a greater or lesser degree inside the receptacle, depending upon the amount of ingredients loaded therein.

The receptacle can thus be placed in a fixed position, e.g. it can be connected in a fixed position to a water dispensing unit. The brewing piston is then moved towards and inside the receptacle to a greater or lesser extent until the final position is reached, the latter being determined by the amount of ingredients in the receptacle forming the brewing chamber. A self-adaptive brewing chamber is thus obtained, i.e. a brewing chamber the volume of which is self-adapting to the amount of ingredients loaded in the chamber. Self-adaptation is obtained by simple hydraulic control of the brewing piston. By controlling or adjusting the pressure in the hydraulic actuator, a constant or settable degree of compaction of the brewing ingredients in the receptacle can be obtained, independent of the actual amount of ingredients loaded therein.

In some embodiments, the volume of the brewing chamber can be adjusted also during the brewing cycle. In some embodiments the hydraulic actuator can be a cylinder-piston actuator, e.g. a single-acting cylinder-piston actuator. A single-acting cylinder-piston actuator is one where the hydraulic fluid generates a thrust only in one direction, movement in the opposite direction being caused by a resilient member, e.g. a compression spring. The hydraulic actuator can be arranged to receive hot water from the same hot-water delivery duct which delivers hot water to the brewing chamber. In preferred embodiments, the hydraulic actuator is powered by pressurized cold water, so that the amount of heat required is reduced.

Contrary to known brewing units using a hydraulic actuator for closing the brewing chamber, according to the subject matter disclosed herein the brewing piston is in sliding and sealing engagement with the inner surface of the receptacle where the ingredients are loaded. The closed position of the brewing piston can thus vary upon the brewing conditions, the amount of ingredients loaded in the brewing chamber, the physical behavior of the ingredients, e.g. an increase or reduction of the volume of the ingredients.

With this arrangement, the brewing piston can penetrate the brewing chamber to the extent required by the brewing conditions and the amount and nature of the ingredients loaded in the brewing chamber. The sliding movement of the brewing piston inside the brewing chamber maintains the ingredients correctly pressed and prevents excess of brewing water from flooding the brewing chamber.

If the hydraulic actuator receives cold water, rather than hot water, only the correct amount of water required for the beverage production needs to be heated and dispensed through the brewing chamber, thus preventing an excess of water to be uselessly heated. The amount of spent ingredients removed from the brewing chamber is reduced. Fluctuations in the amount of bulk ingredients loaded in the brewing chamber are compensated by the movement of the brewing piston in the receptacle. Less amount of bulk ingredients loaded in the receptacle will cause the brewing piston to penetrate inside the brewing chamber to a greater extent. Vice versa, if a larger amount of bulk ingredients is loaded, the brewing piston will penetrate to a lesser extent in the receptacle. The inner volume of the brewing chamber will always be correctly set for the amount of ingredients loaded each time in the brewing chamber. In some embodiments, the cold water pressure in the actuator can be set by the user, to influence the brewing conditions and thus control the final organoleptic characteristics of the beverage.

According to some embodiments, if the volume of the ingredients changes during brewing, e.g. due to part of the ingredients being dissolved in the brewing water, the volume of the brewing chamber automatically changes thus making up for the reduced volume of the ingredients, preventing an excess of water in the brewing chamber at the end of the brewing cycle. The spent ingredients, e.g. spent coffee powder, discharged from the brewing chamber will contain a minimum amount of water, as the water has been squeezed out by the movable brewing piston during the brewing cycle.

In some embodiments a spacer is provided, for mechanically connecting the brewing piston to a movable member of the hydraulic actuator, e.g. an actuating piston slidingly arranged in an outer cylinder. In other embodiments, the actuator can comprise a stationary piston and a movable cylinder, which is connected mechanically to the brewing piston by means of the spacer. The spacer separates the brewing piston from the hydraulic actuator, so that cold water delivered to the hydraulic actuator does not remove heat from the brewing chamber.

In preferred embodiments, the hot-water delivery duct may extend at least partly inside the spacer.

The brewing piston can form a single body with an actuating piston of the hydraulic actuator. A single body shall be understood as a mechanical component formed by one or more members that are mechanically rigidly constrained one to the other to form a unit. In some embodiments a single body can be a monolithic body, e.g. molded or die-cast as a single piece.

The infusion unit can comprise a water pump and a water heater in fluid communication with the hot-water delivery duct. The water pump selectively delivers cold water to and through the water heater. In some embodiments water can be drawn by the pump from a container o reservoir.

In some embodiments the infusion unit further comprises a pressure-control arrangement connecting the water pump to the water heater and to the hydraulic actuator. The pressure control arrangement can advantageously be configured for initially conveying a major part of a pressurized water flow delivered by the pump towards the hydraulic actuator, so as to close the brewing chamber and compact the ingredient(s) loaded in the brewing chamber; and for subsequently reducing the amount of water delivered to the hydraulic actuator and increasing the amount of water delivered through the water heater and the hot-water delivery duct into the brewing chamber.

In some embodiments, the pressure control arrangement can be designed and arranged such that the entire water flow is initially delivered to the hydraulic actuator until a certain pressure threshold is reached. Once the pressure threshold has been reached, a portion of the water flow can be delivered through the water heater and from there to the brewing chamber. The amount of cold water delivered to the hydraulic actuator can be gradually reduced, in a continuous manner or stepwise, until the entire water flow is delivered through the water heater and to the brewing chamber. A pressure sensor or an automatic valve or any suitable control system can be provided in order to maintain the correct pressure value in the hydraulic actuator and thus in the brewing chamber. The pressure control arrangement can be designed and arranged such that if the pressure in the brewing chamber diminishes, e.g. due to a reduction of the volume of the ingredients loaded therein, further cold water will be delivered to the hydraulic actuator for compensating the volume reduction. The water delivered to the hydraulic actuator will push the brewing piston further into the brewing chamber, the movement being allowed by the sliding and sealing co-action between the sealing arrangement provided on the brewing piston and the side surface of the brewing chamber.

The receptacle can be comprised of or being formed by a filter and a filter holder. The filter holder can be part of an automatic beverage producing machine. In other different embodiments the filter holder is designed for manual connection to a water dispensing unit, wherein the brewing piston slidingly housed. A locking mechanism can be provided for locking the filter holder to water dispensing unit. For example a bayonet-type locking mechanism can be provided. In other embodiments, the filter holder can be introduced in a locking seat with a simple translation motion rather than being locked by rotation, as in the case of a bayonet-type locking mechanism.

Since sealing of the brewing chamber is ensured by the side sealing arrangement provided on the brewing piston and co-acting with the side wall of the brewing chamber formed by the receptacle where the ingredients are loaded, locking of the filter holder to the infusion unit does not require but a limited effort. Conversely, in standard manual machines comprising a filter fitted in a filter holder, the latter must be forcedly locked to the water dispensing unit, thus generating sufficient contact force between a front seal, provided on the water dispensing unit, and the filter holder.

The use of a brewing piston with a side sealing arrangement in sliding and sealing contact with the side wall of the receptacle containing the ingredients for the beverage preparation makes use of the infusion unit simpler, more user-friendly and more efficient.

According to a further aspect of the invention, a method for preparing a beverage by infusion is provided, the method comprising:

loading at least one ingredient in bulk form in a receptacle;

introducing a brewing piston inside the receptacle and forming a brewing chamber therewith, the brewing piston being provided with a sealing arrangement for sliding and sealing engagement with an inner wall of the receptacle when the brewing piston is in the receptacle;

adjusting the volume of the brewing chamber by moving the brewing piston in a brewing position inside the receptacle, the brewing position being adapted to the amount of the ingredient in the brewing chamber;

delivering hot water in the interior of the brewing chamber through the brewing piston and performing a brewing cycle;

wherein the brewing piston is controlled by a hydraulic actuator constrained to the brewing piston.

The invention also concerns a beverage producing machine, in particular a hot-beverage producing machine, such as an espresso coffee maker, including an infusion unit as set forth above.

Further features and advantages of the invention are set forth in the following description of exemplary embodiments thereof and in the enclosed claims, which form an integral part of the present description.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings.

DESCRIPTION OF EMBODIMENTS OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Here below reference will specifically be made to a coffee machine. It shall be understood, however, that at least some of the advantages of the present invention can be obtained embodying the invention in a different kind of beverage producing machine.

Figure 1:
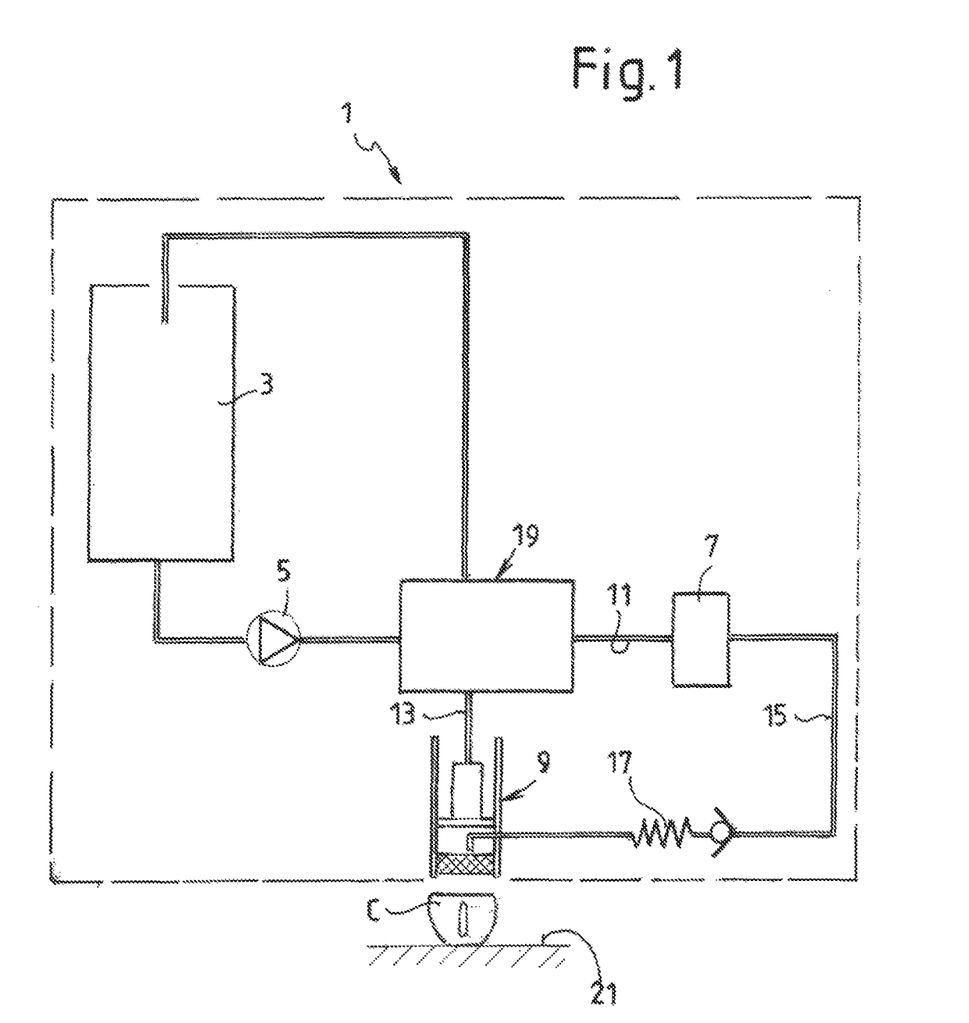
FIG. 1 illustrates a diagrammatic representation of a beverage producing machine with the main components thereof useful for understanding of the present invention.

FIG. 1 illustrates the main components of a beverage producing machine according to the invention. The machine is indicated with 1 and comprises a water tank 3, a pump 5, a water heater 7 and an infusion unit 9. The pump 5 is connected through a first duct 11 to the water heater and through a second duct 13 directly to the infusion unit 9. A duct 15 connects the output of the water heater 7 through a check valve 17 to the infusion unit 9.

As will be disclosed in greater detail here below, the water pumped by pump 5 flows through a valve system 19 which controls the water flow through ducts 13 and 15 in order to close a brewing chamber formed in the infusion unit 9 by means of a hydraulic system and to deliver hot pressurized water in and through the brewing chamber to produce the coffee beverage. Coffee is dispensed in a cup C placed on a resting surface 21 or the like.

As will explained with reference in particular to FIGS. 2 and 3, the infusion unit 9 comprises a hydraulic system receiving pressurized cold water from pump 5 through duct 13 to close the brewing chamber and hot pressurized water from the water heater 7 through the duct 15 to produce the beverage. The water heater 7 can be a flow-through or instant water heater, i.e. a heater which instantly heats the water during the infusion cycle.

In the following detailed description of FIGS. 2 and 3, reference will be made to a manual coffee or espresso machine, including a filter and a filter holder which are manually attached to a hot water dispensing unit in which the infusion unit 9 is embodied.

In some embodiments, the water dispensing unit is a unit housing the infusion unit and connected to the water circuit of the beverage producing machine. The water dispensing unit is usually configured for attachment of an ingredient-receiving receptacle thereto. The water dispensing unit is usually provided with connection means for connecting a filter holder comprised of an ingredient receptacle. As will become apparent from the following description, the water dispensing unit can be provided with a hot-water dispensing duct, a brewing piston designed to slidingly penetrate in the receptacle of the brewing chamber and a hydraulic actuator for controlling the brewing piston.

Some of the advantages of the invention can be achieved also by embodying the invention in a semi-automatic or fully-automatic beverage producing machine.

Figure 2:
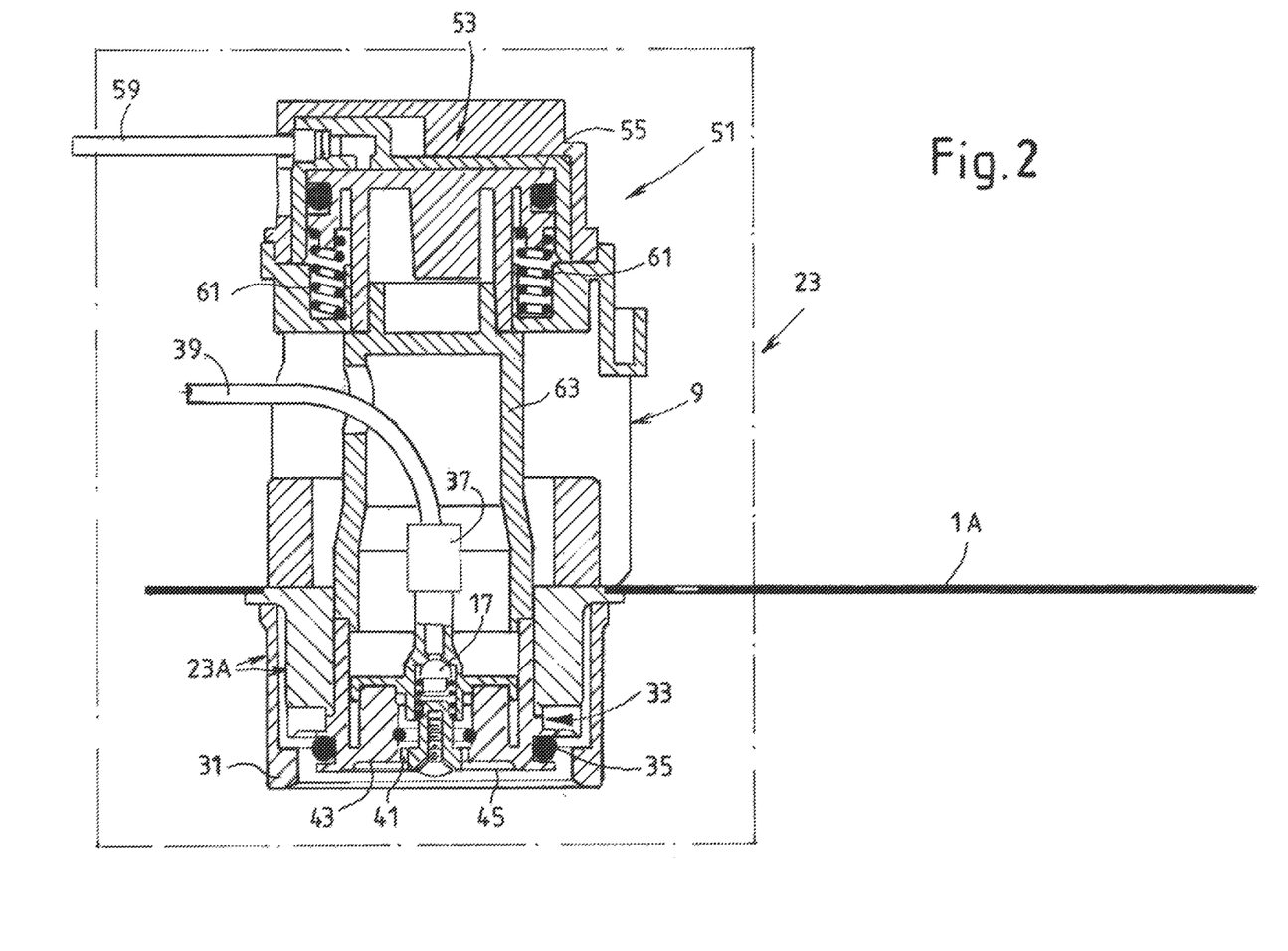
FIGS. 2 and 3 illustrate a sectional view of the infusion unit in the opened position and in the closed position, respectively.
Figure 3:
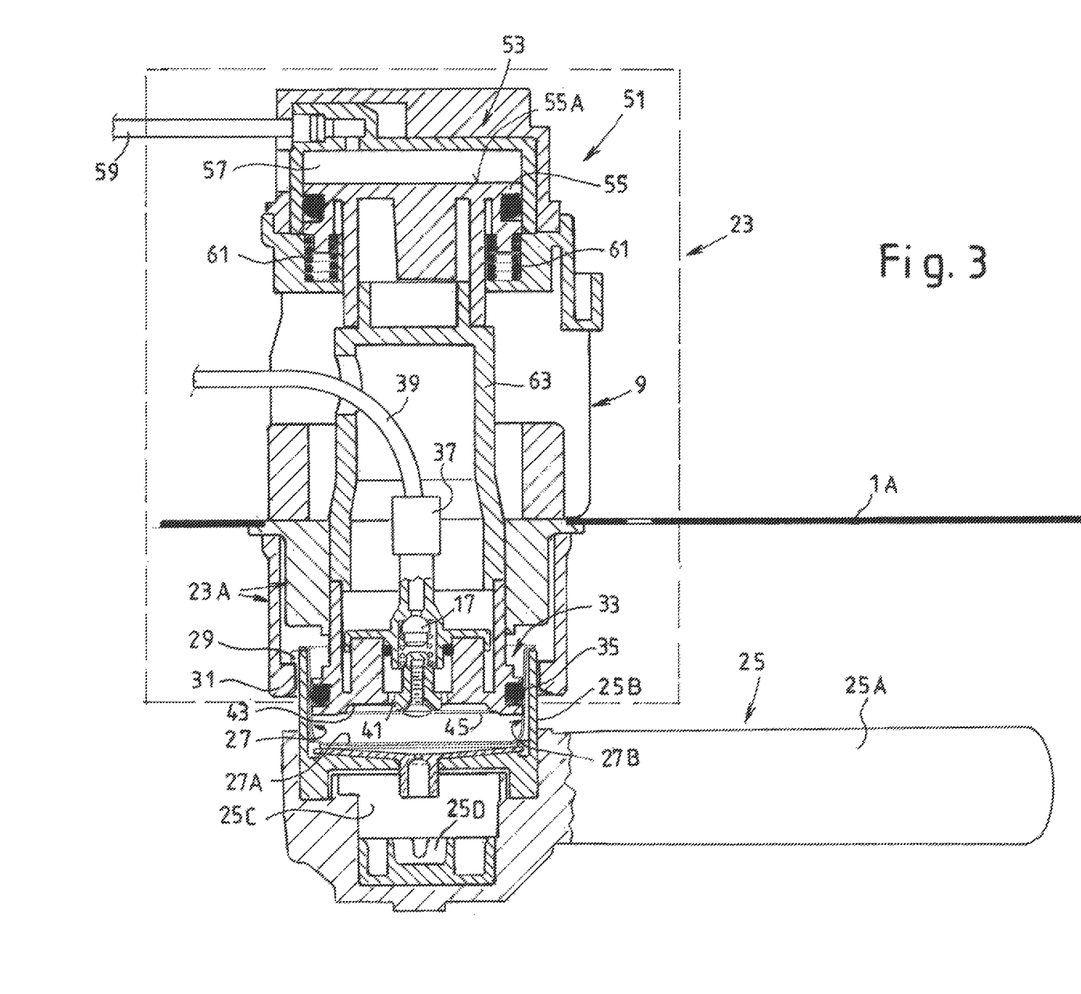

In FIGS. 2 and 3 reference number 23 indicates a hot water dispensing unit which comprises the infusion unit 9 and which is partly housed in a housing 1A of the coffee machine 1. The lower portion of the water dispensing unit 23, shown at 23A, can project from a lower panel of the machine housing 1A and is designed for attaching thereon a filter holder 25 in which a filter 27 can be placed. The filter holder 25 can comprise a handle 25A and a seat 25B for the filter 27. The filter 27 forms a receptacle for coffee powder, which can be charged manually therein by the user.

The filter 27 can be cup-shaped. In some embodiments, the filter holder is provided with a bottom wall 27A and a preferably approximately cylindrical or conical side wall 27B. The bottom wall 27A is apertured to allow the coffee beverages to flow through the apertured bottom wall 27A into a chamber 25C formed in the filter holder 25 and in fluid communication with a dispensing spout 25D through which the coffee beverage can be dispensed in the cup C. In other embodiments, the filter can be comprised of a bottom wall 27A only, and not including a side wall 27B.

The seat 25B of the filter holder 25 can be provided with locking means 29, for example in the form of a bayonet locking member co-acting with a locking seat 31 formed in the lower part of the hot water dispensing unit 23. The locking means 29, 31 can be designed such that the filter 27 arranged in the filter holder 25 is always placed in the same position with respect to the dispensing unit 23.

The infusion unit 9 comprises a brewing piston 33, which is arranged and designed to penetrate the filter 27, thus forming a brewing chamber for the extraction of the coffee beverage.

The brewing piston 33 is provided with a sealing arrangement 35 peripherally arranged around the brewing piston 33. In some embodiments the sealing arrangement 35 comprises an O-ring housed in a circular groove formed in the body of the brewing piston 33. In other embodiment the sealing arrangement can comprise a sealing lip of any other sealing or gasket arrangement designed and arranged for sliding and sealing engagement with the inner side surface of the side wall 27B of the receptacle formed by the filter 27. If the filter 27 is formed by the bottom wall 27A only, and does not comprise a side wall 27B, the sealing arrangement 35 can slidingly and sealingly co-act with the inner surface of the seat 25B of the filter holder 25B, directly.

The brewing piston 33 is in fluid communication with a hot-water delivery duct. For example, the brewing piston 33 can be comprised of a pipe fitting 37, connected to the end of a hose 39, said hose 39 forming part of the hot-water delivery duct, for example the duct schematically illustrated with reference 15 in FIG. 1.

The pipe fitting 37 is in fluid communication through a check valve, here again labelled 17, and apertures 41 with a water distribution chamber 43 closed on the bottom by an apertured disc-shaped member 45. When the check valve 17 opens, hot and pressurized water can flow through the hose 39, the pipe fitting 37, the check valve 17, the apertures 41, the chamber 43 and the apertures in the disc member 45 and finally into the brewing chamber formed by the filter 27 and the brewing piston 33.

In the embodiment illustrated in the drawings, the infusion unit 9 further comprises a hydraulic actuator labeled 51 as a whole. In the embodiment illustrated in the drawings, the hydraulic actuator 51 comprises a single acting cylinder-piston actuator with a cylinder 53 slidingly housing an actuating piston 55. Between the top surface of the actuating piston 55 and the ceiling of the cylinder 53 a pressure chamber 57 is formed. The pressure chamber 57 is in fluid communication with a hose or pipe 59, which can form part of the cold pressurized water duct 13 shown in FIG. 1.

Resilient members, for example compression helical springs 61 are arranged between the body forming the cylinder 53 and the actuating piston 55 of the hydraulic cylinder-piston actuator 51, said resilient members biasing the actuating piston 55 towards the upper position, against the pressure of the water delivered through pipe or hose 59.

The actuating piston 55 is mechanically constrained to the brewing piston 33. Preferably, the two pistons 55 and 33 are distanced from one another, so that cold water delivered in the pressure chamber 57 of the actuator 51 does not remove heat from the brewing chamber. In the example illustrated in the drawings, the actuating piston 55 and the brewing piston 33 are both connected by a spacer 63. More specifically one end (the upper end in the drawings) of the spacer 63 is connected to the actuating piston 55, while the other end (the lower end in the drawings) is connected to the brewing piston 33.

To generate a properly balanced hydraulic thrust during closure of the brewing chamber, the surface 55A of the actuating piston 55 is larger than the lower surface of the brewing piston 33. In this way even if the water pressure in hose 59 and in hose 39 is the same, the brewing chamber will be correctly closed by the brewing piston 33, since the closing force generated by water pressure on the brewing piston 33 will result in a force smaller than the force generated by the water pressure on the larger surface 55A of the actuating piston 55.

In advantageous embodiments, the spacer 63 is hollow and the hose 39 of the hot-water delivery duct 15 extends inside the spacer 63, in the hollow interior volume whereof the pipe fitting 37 is arranged. In other embodiments, the hose 39 can be arranged outside the spacer 63.

The infusion unit 9 disclosed so far operates as follows.

In FIG. 2 the infusion unit 9 is in the open position, with the brewing piston 33 in its uppermost position and the filer holder 25 detached from the hot water dispensing unit 23. Coffee powder is charged and slightly compacted in the receptacle formed by the filter 27.

The filter holder 25 can then be locked by means of the bayonet locking device 29, 31 to the bottom of the water dispensing unit 23. Other locking arrangements can be used instead of a bayonet locking device, e.g. a slider/guide arrangement or a thread arrangement or the like.

The brewing cycle can now start by firstly delivering cold water pumped by pump 5 through the valve system 9, 19 and the cold water delivery duct 13, 59 in the pressure chamber 57 of the hydraulic actuator 51.

The cold water delivered to the hydraulic actuator 51 causes movement of the brewing piston 33 inside the receptacle formed by the filter 27. By gradually lowering the brewing piston 33, the coffee powder charged in the filter 27 is compacted in the brewing chamber formed by the filter 27 and the brewing piston 33. Once a sufficient pressure has been achieved inside the brewing chamber, said pressure corresponding to a pressure in the cold water delivery duct 13, the valve system 19 starts delivering water through duct 11 to the water heater 7 and from there, through the hot-water delivery duct 15 to the brewing piston 33. When the water pressure in the hot-water delivery duct 15 and in the hose 39 overcomes the force of the spring closing the check valve 17, hot water starts flowing in the brewing chamber, producing the coffee beverage.

During this step of the brewing cycle, the pressure inside the pressure chamber 57 is maintained, so that the coffee powder in the brewing chamber 27, 33 remains properly compacted.

If the volume of the coffee powder in the brewing chamber reduces as a consequence of the hot pressurized water flowing there through, the pressure of the cold water in the pressure chamber 57 of the hydraulic actuator 51 will cause the brewing piston 33 to penetrate further in the receptacle formed by the filter 27. In this manner the proper pressure and volume are always maintained in the brewing chamber. Sealing of the brewing chamber is provided by the side sealing arrangement 35 slidingly contacting the inner surface of the side wall 27B of the receptacle formed by the filter 27. This sliding engagement between the sealing arrangement 35 and the surface of wall 27B gives the possibility of moving the brewing piston 33 during the brewing cycle according to needs. If the filter 27 does not include a side wall 27B, the same effect is achieved by co-action of the sealing arrangement 35 with the approximately cylindrical inner surface of the seat 25B of the filter holder 25B.

Moreover, the position of the brewing piston 33 in the receptacle formed by the filter 27 can be adjusted automatically by means of the pressure control, depending upon the amount of coffee powder charged in the filter 27. It is thus possible to charge in the filter 27 a smaller or larger amount of coffee powder depending on whether one or two coffee cups are required and/or depending on the organoleptic characteristics of the coffee, which the user requires.

At the end of the brewing cycle the volume of the brewing chamber formed by the brewing piston 33 and the filter 27 corresponds to the minimum volume occupied by the spent coffee powder, without any excess of water on top of the spent coffee powder, thus reducing the amount of water which is discharged from the filter holder once the latter is removed from the hot water dispensing unit 23. This is made possible by the brewing piston 33 keeping on moving inside the brewing chamber during the brewing cycle, if required, thanks to the action of the hydraulic actuator 51 on the one side and the possibility of sliding of the piston 33 inside the receptacle formed by the filter 27.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An infusion unit comprising:
   a receptacle comprising a filter and a filter holder for receiving at least one ingredient in bulk form for preparation of a beverage;
   a brewing piston arranged for insertion in the receptacle and forming a brewing chamber therewith, the brewing piston being provided with a sealing arrangement for sliding and sealing engagement with an inner side surface of a side wall of the receptacle formed by said filter when the brewing piston is in the receptacle;
   a hydraulic actuator comprising a single-acting cylinder-piston actuator for controlling movement of the brewing piston so as to adjust volume of the brewing chamber by moving the brewing piston in a brewing position inside the receptacle, the brewing position being adapted to an amount of the at least one ingredient in the brewing chamber;
   a spacer for mechanically constraining the brewing piston to a movable member of the hydraulic actuator, said spacer being connected to an actuating piston at a first distal end and to the brewing piston at a second distal end, wherein a surface of the actuating piston is larger than a lower surface of the brewing piston; and a hot water delivery system for delivering hot water in an interior of the brewing chamber and performing a brewing cycle, the hot water delivery system comprising a hot water delivery duct in direct fluid communication with a surface of the brewing piston, wherein the surface faces the interior of the brewing chamber when the brewing piston is inside the receptacle.

2. The infusion unit according to claim 1, wherein said hot water delivery system comprises a hot-water delivery duct in fluid communication with an upper surface of the brewing piston, the surface facing the interior of the brewing chamber when the brewing piston is inside the receptacle.

3. The infusion unit according to claim 2, wherein the hot-water delivery duct extends partly inside the spacer.

4. The infusion unit according to claim 2, further comprising:
 a water pump;
 a water heater in fluid communication with the hot-water delivery duct; and
 a pressure-control arrangement connecting the water pump to the water heater and the hydraulic actuator;
 wherein the pressure-control arrangement is configured for:
 initially conveying a major part of a pressurized water flow delivered by the water pump towards the hydraulic actuator, so as to close the brewing chamber and compact the at least one ingredient in the brewing chamber, and
 subsequently reducing an amount of water delivered to the hydraulic actuator and increasing the amount of water delivered through the water heater and the hot-water delivery duct into the brewing chamber.

5. The infusion unit according to claim 1, wherein the hydraulic actuator is constrained to the brewing piston.

6. The infusion unit according to claim 1, wherein the hydraulic actuator is in fluid communication with a cold water delivery duct arranged for delivering pressurized cold water to the hydraulic actuator.

7. The infusion unit according to claim 6, wherein a pressure chamber of the hydraulic actuator is in fluid communication with a hose or pipe which forms part of the cold water delivery duct.

8. The infusion unit according to claim 1, wherein the brewing piston forms a single body with said single-acting cylinder-piston actuator of the hydraulic actuator.

9. The infusion unit according to claim 1, wherein the hydraulic actuator controls the movement of the brewing piston inside the receptacle during the brewing cycle.

10. The infusion unit according to claim 1, wherein resilient members are arranged between a body forming a cylinder and the actuating piston for biasing the single-acting cylinder-piston actuator towards an upper position against water pressure delivered via an inlet pipe.

11. The infusion unit according to claim 1, further comprising a locking mechanism for locking the filter holder to a water dispensing unit, the locking mechanism comprising a locking seat in the water dispensing unit, in which the filter holder is slidably received via a single translation movement.

12. The infusion unit according to claim 11, wherein the water dispensing unit houses the infusion unit.

13. The infusion unit according to claim 12, wherein the water dispensing unit is connected to a water circuit of a beverage producing machine.

14. The infusion unit according to claim 1, wherein the spacer is hollow and a hose of a hot-water delivery duct extends inside a hollow interior volume whereof a pipe fitting is arranged.

15. The infusion unit according to claim 1, wherein the brewing piston is comprised of a pipe fitting connected to an end of a hose forming a part of the hot-water delivery system.

16. A beverage producing machine comprising an infusion unit according to claim 1.

* * * * *